(12) United States Patent  (10) Patent No.: US 8,920,095 B2
Baugh, Sr.  (45) Date of Patent: Dec. 30, 2014

(54) FASTENER REPLACING A BOLT OR RIVET

(71) Applicant: Pierce A. Baugh, Sr., Furlong, PA (US)

(72) Inventor: Pierce A. Baugh, Sr., Furlong, PA (US)

(73) Assignee: Dolphin Tree, LLC, Furlong, PA (US)

( * ) Notice: Subject to any disclaimer, the term of this patent is extended or adjusted under 35 U.S.C. 154(b) by 0 days.

(21) Appl. No.: 13/907,252

(22) Filed: May 31, 2013

(65) Prior Publication Data

US 2014/0072386 A1 Mar. 13, 2014

Related U.S. Application Data

(60) Provisional application No. 61/700,875, filed on Sep. 13, 2012.

(51) Int. Cl.
| | |
|---|---|
| *F16B 21/00* | (2006.01) |
| *F16B 19/00* | (2006.01) |
| *F16B 21/07* | (2006.01) |
| *F16B 5/06* | (2006.01) |

(52) U.S. Cl.
CPC ............... *F16B 19/00* (2013.01); *F16B 21/073* (2013.01); *F16B 5/0642* (2013.01)
USPC ........................................................ 411/512

(58) Field of Classification Search
USPC ......... 411/351, 383, 424, 511, 512, 517, 950, 411/961
See application file for complete search history.

(56) References Cited

U.S. PATENT DOCUMENTS

| | | | |
|---|---|---|---|
| 2,003,591 A | 6/1935 | Hayden | |
| 3,046,828 A * | 7/1962 | Dzus .............................. | 411/527 |
| 3,078,334 A | 2/1963 | Forman | |
| 3,102,447 A | 9/1963 | Gregory et al. | |
| 3,246,439 A * | 4/1966 | Foster, Jr. et al. ............... | 52/698 |
| 3,262,480 A | 7/1966 | Storch | |
| 3,443,783 A | 5/1969 | Fisher | |
| 3,474,845 A | 10/1969 | Podell | |
| 3,542,106 A | 11/1970 | Busch | |
| 3,551,963 A | 1/1971 | Mosher et al. | |
| 3,601,823 A | 8/1971 | Isaacs | |
| 3,756,116 A | 9/1973 | Schuplin | |
| 3,763,909 A | 10/1973 | Stover | |
| 3,865,006 A | 2/1975 | Massoney | |
| 4,089,248 A | 5/1978 | Anscher | |
| 4,193,434 A | 3/1980 | Wagner | |
| 4,276,806 A | 7/1981 | Morel | |
| 4,439,953 A | 4/1984 | Block et al. | |
| 4,632,616 A | 12/1986 | Sidoti | |
| 4,715,756 A | 12/1987 | Danico et al. | |
| 4,828,444 A * | 5/1989 | Oshida .......................... | 411/437 |
| 4,934,889 A * | 6/1990 | Kurosaki ....................... | 411/433 |
| 5,000,637 A | 3/1991 | Adams | |
| 5,098,242 A * | 3/1992 | Schaty .......................... | 411/437 |
| 5,222,988 A | 6/1993 | Riley | |

(Continued)

*Primary Examiner* — Roberta Delisle

(74) *Attorney, Agent, or Firm* — IP Works, PLLC

(57) ABSTRACT

A fastener for securing workpieces is faster and easier to use than a conventional bolt or rivet, requires no tools to use, and is made from a material that does not rust, such as plastic. The fastener comprises a bottom plate with a ribbed shaft extending therefrom and inserted into a top plate with a throughhole adapted to accept the ribbed shaft. Workpieces intended for fastening are placed in between the two plates with the ribbed shaft inserted through them. Protruding from the interior of the throughhole of the top plate is at least one locking tab adapted to engage the ribs of the ribbed shaft to ensure securement.

26 Claims, 2 Drawing Sheets

(56) References Cited

U.S. PATENT DOCUMENTS

| | | |
|---|---|---|
| 5,302,070 A * | 4/1994 | Kameyama et al. .......... 411/437 |
| 5,350,266 A | 9/1994 | Espey et al. |
| 5,472,016 A | 12/1995 | Szabo |
| 5,598,994 A * | 2/1997 | Olewinski et al. .............. 248/73 |
| 5,639,196 A * | 6/1997 | Murase et al. ................. 411/433 |
| 5,816,762 A * | 10/1998 | Miura et al. ................... 411/433 |
| 6,116,833 A * | 9/2000 | Ellis .............................. 411/384 |
| 6,305,892 B1 | 10/2001 | Qiao |
| 6,341,917 B1 | 1/2002 | Schubring et al. |
| 6,442,806 B1 * | 9/2002 | Wesson ..................... 24/573.11 |
| 6,537,006 B1 | 3/2003 | Clark |
| 6,704,972 B2 | 3/2004 | Pyle |
| 6,729,822 B2 | 5/2004 | Sbongk |
| 6,832,869 B2 | 12/2004 | Lauchner |
| 6,832,882 B2 | 12/2004 | Janisch, Jr. et al. |
| 6,974,292 B2 | 12/2005 | Hansen |
| 7,156,598 B2 | 1/2007 | Tibbenham et al. |
| 7,497,652 B2 | 3/2009 | Lin |
| 7,811,038 B2 | 10/2010 | Jimenez |
| 7,891,151 B2 * | 2/2011 | Sano .......................... 52/506.05 |
| 7,963,726 B2 | 6/2011 | Boot |
| 2009/0285651 A1 | 11/2009 | Cooley |
| 2011/0217141 A1 | 9/2011 | Disantis et al. |
| 2012/0063866 A1 | 3/2012 | Jeong et al. |

* cited by examiner

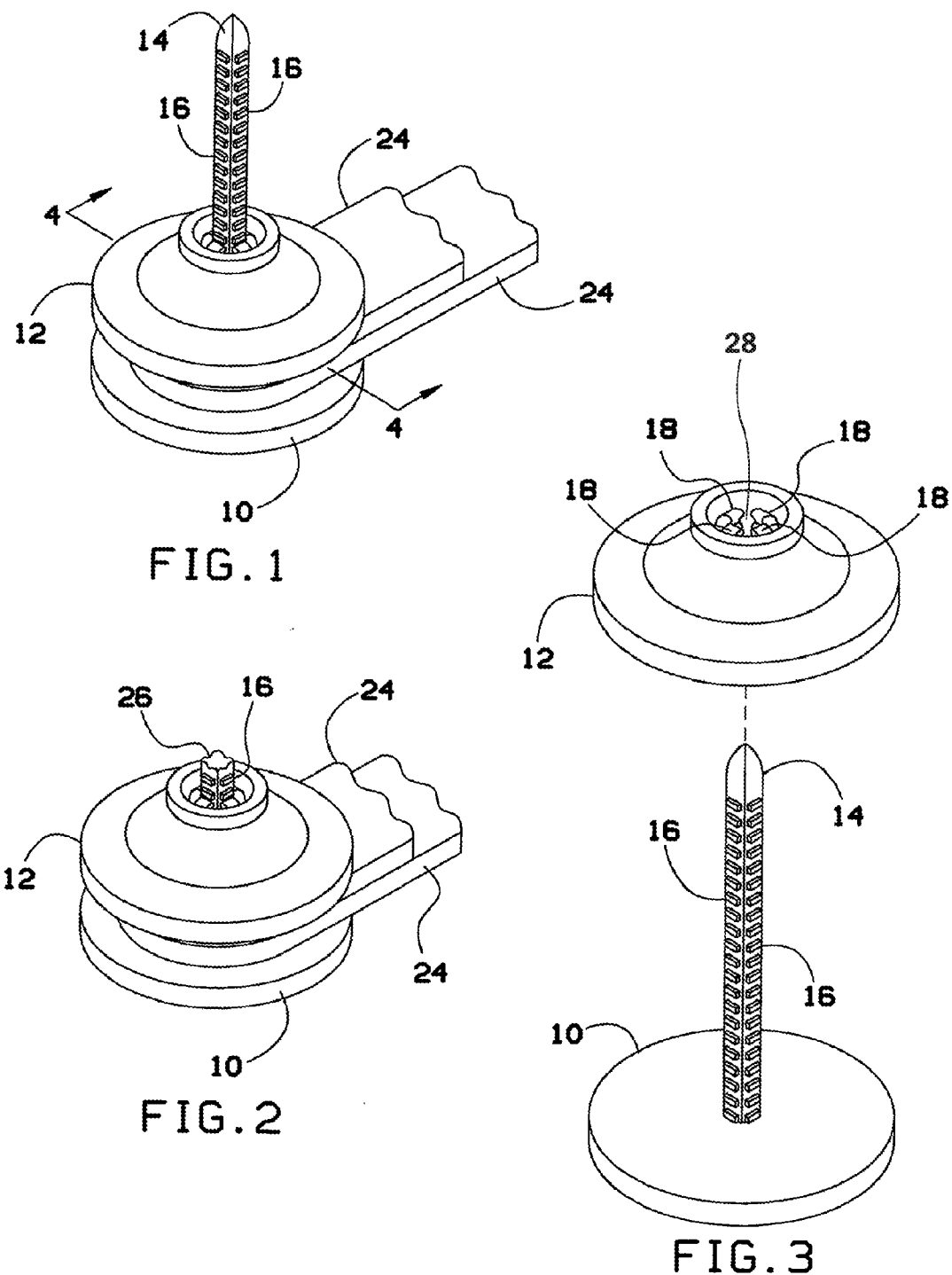

FASTENER REPLACING A BOLT OR RIVET

RELATED APPLICATIONS

This patent application is related to provisional patent application Ser. No. 61/700,875 entitled "Fastener Replacing a Bolt or Rivet" filed on Sep. 13, 2012, priority from which is hereby claimed.

BACKGROUND AND SUMMARY OF THE INVENTION

The present invention relates to fasteners and, more particularly, to a rust-proof fastener that can replace a bolt or rivet.

Bolts and nuts are often used to secure items together. Often, bolts and nuts rust and nuts can freeze on the bolt, making them hard to remove. Moreover, conventional bolts and nuts require tools to make an appropriate assembly and, if not appropriately assembled (or even when fully tightened together), nuts can loosen on the bolt due to, for example, vibrating components.

Rivets can be used in place of bolts and nuts. However, rivets require expensive equipment to put in place and remove. Further, similar to metal bolts and nuts, metal rivets can rust and/or corrode, loosening the joint or, in some cases, causing the joint to fail.

As can be seen, there is a need in the art for an improved and rust-proof fastener that can quickly and easily fasten two materials physically together without the use of tools and can be later removed if desired.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention

BRIEF DESCRIPTION OF THE DRAWINGS

FIG. 1 is a perspective view of a fastening device, in use, according to an exemplary embodiment of the present invention.

FIG. 2 is a perspective view of the fastening device of FIG. 1, showing its ribbed shaft trimmed after installation.

FIG. 3 is an exploded perspective view of the fastening device of FIG. 1.

DETAILED DESCRIPTION OF THE PREFERRED EMBODIMENTS

Figure 4:
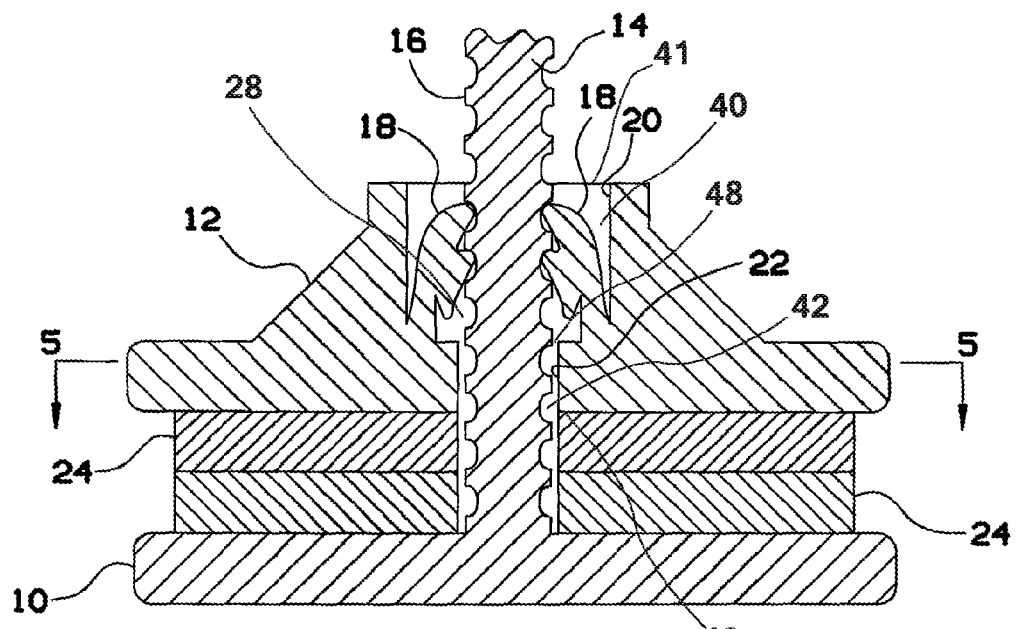
FIG. 4 is a cross-sectional view taken along line 4-4 of FIG. 1.

The following detailed description and the drawings FIGS. 1 through 5 are of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention provides a rust-proof fastener that replaces conventional bolts or rivets while avoiding many of the issues associated with these conventional bolts or rivets. The fastener of the present invention can include a base plate, which may generally be disk shaped, having a ribbed shaft extending therefrom (representing, for example, the function of a conventional bolt, with a head and a shaft). A second plate, called a "top plate" herein, includes at least one locking tab for receiving the ribbed shaft (representing, for example, the function of a conventional nut). As the top plate is slid along the ribbed shaft toward the base plate, the top plate's locking tab(s) engage(s) the ribbed shaft and prevents removal in the opposite direction (similar to a conventional nut threaded on a bolt). The fastener of the present invention is faster and easier to use than a conventional bolt or rivet, requires no tools to use, and preferably is made from a material that does not rust, such as plastic. The two plates may be separated by removing a sufficient portion of excess ribbed shaft protruding through the top plate or the locking tabs using conventional wire cutters or shears.

Referring now to FIGS. 1 through 5, a base plate 10 can be designed as a flat, round member having a ribbed shaft 14 extending from a central region of one side thereof. The side having the shaft 14 extending from it is herein called the "interior" side, and the other side of the base plate is called the "exterior" side. Other shapes are contemplated for the base plate 10. For example, the base plate 10 could have a hexagonal shape to resemble a conventional bolt or could have a rounded, convex exterior side with a square protrusion on the interior side, resembling a conventional carriage bolt design. The base plate 10 could be shaped with a polygonal protrusion on the interior side to resist turning if placed in a correspondingly shaped hole, or the base plate 10 could have a flared interior side adapted to countersink the base plate 10 so that the exterior side of the base plate 10 is flush with the surface of the workpiece being fastened. Alternatively, the base plate 10 could be shaped, sized, and colored according to a particular desired aesthetic, whether decorative or camouflaged relative to the article being fastened, so long as the diameter of the base plate is greater than the cross-sectional diameter of the shaft 14.

The ribbed shaft 14 can be a shaft with a rectangular cross section, as shown in the FIGS. 1, 2, 3, and 5, with ribs 16 on at least one side thereof. As used herein, "rectangular" means having four sides and thus includes a square. Typically, in a rectangular shaft the ribs 16 are disposed on at least opposing sides of the shaft 14. Often, the ribs 16 are disposed on all sides of the shaft 14. In many embodiments the ribs 16 are laterally disposed relative to the shaft 14 and are typically positioned at regularly spaced intervals. The shaft 14 may be made in other shapes, such as having a rectangular, triangular, or other polygonal cross-section, or may have a cross-section that is partially or entirely arcuate, for example, having the shape of an ellipse, crescent or semicircle or any combination of angles and curves. In many embodiments, substantially the entire length of the shaft 14 is ribbed, either on one or multiple sides of the shaft 14. These ribs 16 also are often positioned at regularly spaced intervals. A round shaft 14, i.e. a shaft having a circular cross-section, may permit a top plate 12, as described in greater detail below, to rotate on the shaft 14, while still being secured thereto.

The top plate 12 can include one or more locking tabs 18 that protrude into a throughhole 28 oriented inside top plate 12. In the embodiment shown in FIGS. 1 through 5, the top plate 12 has on its bottom side bottom opening 43 sized to accept the shaft 14. The locking tabs 18 are operable to engage the ribs 16 on the shaft 14 when the top plate 12 is slid along the shaft 14 toward the base plate 10. The locking tabs 18 can be disposed within the top opening 41 of top plate 12 to correspond with the position of the ribs 16 along the shaft 14. For example, in the rectangular shaft 14 with ribs 16 on all four sides, as shown in FIGS. 1, 2, 3, and 5, the locking tabs 18 can include four locking tabs 18, each operable to engage one side of the shaft 14.

Figure 5:
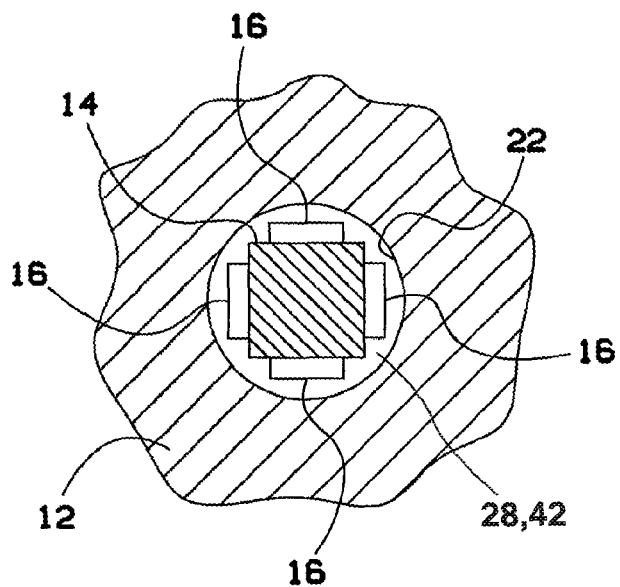
FIG. 5 is a cross-sectional view taken along line 5-5 of FIG. 4.

Throughhole 28 defines one or more cavities oriented within top plate 12. In the preferred embodiment, a first cavity 40 is defined at its top by top opening 41 and at its bottom by an intermediate opening 48. First cavity 40 is bounded longitudinally on all sides by a first interior wall 20. Often the locking tabs 18 protrude from the first interior wall 20. A second cavity 42 is defined at its top by intermediate opening 48 and at its bottom by bottom opening 43. Second cavity 42 is bounded longitudinally on all sides by a second interior wall 22. As best seen in FIG. 4, the floor of the first cavity 40 contains intermediate opening 48 which opens into second cavity 42 at the top of second cavity 42. FIG. 5 depicts second interior wall 22 with a circular cross-section. The cross-sectional shape of throughhole 28—and, as it follows, the cross-sectional shapes of first cavity 40, second cavity 42, top opening 41, bottom opening 43, and intermediate opening 48—may be rectangular, triangular, polygonal, elliptical, or arcuate, provided they are adapted to accept shaft 14.

Referring to FIG. 4, the diameter of top opening 41 is greater than the diameter of bottom opening 43. For instance, FIG. 4 depicts throughhole 28 defined by first cavity 40 and second cavity 42. Top opening 41 has a greater diameter than bottom opening 43. This configuration creates two cavities with different opening diameters within top plate 12. In its top side, top plate 12 contains first cavity 40 which has a greater diameter than second cavity 42 which is oriented in the bottom side of top plate 12. First cavity 40 is defined at its bottom end by a floor comprising intermediate opening 48 in communication with a top end of second cavity 42. In some embodiments the locking tabs 18 protrude from this floor. Alternatively, they may protrude from first interior wall 20 or second interior wall 22.

In another embodiment, second cavity 42 and first cavity 40 may be reversed; i.e. first cavity 40 is on the bottom side of top plate 12 and second cavity 42 is on the top side. First cavity 40 has a greater diameter than second cavity 42. Therefore, in this embodiment, top opening 41 has a smaller diameter than bottom opening 43. Further, first cavity 40 is defined at its top end by a ceiling comprising intermediate opening 48 in communication with a bottom end of second cavity 42. In some embodiments the locking tabs 18 protrude from this ceiling.

Various designs are contemplated for the ribs 16 and the locking tabs 18. For example, the locking tabs 18 may include two locking protrusions that engage adjacent ribs 16, as shown in FIG. 4. Alternatively, the locking tabs may include a different number of locking protrusions that engage ribs 16 on the shaft 14. Preferably, the ribs 16 have a generally rectangular cross-section, but the cross-section of the ribs 16 may be any angular, circular, elliptical, or arcuate shape sufficient to engage the locking protrusions on the locking tabs 18. Ribs 16 with triangular and other polygonal cross-sections are also effective. In most embodiments the ribs 16 have a uniform size and shape throughout.

The fastener of the present invention can be made from various rust-proof materials, including plastics, resins or other polymers, or even rust-proof metals, depending on the specific application. Various strengthening additives may be added to enhance durability and/or tensile strength of the fastener. For example, carbon fiber or other such strengthening agents could be used in some or all of the components of the fastener of the present invention. In some embodiments, the fastener of the present invention can be made in a plastic injection molding process.

To use the fastener of the present invention, a user can simply insert the shaft 14 through the workpiece items 24 intended to be fastened together and slide the top plate 12 over the shaft 14 until a desired tightness is achieved. Excess length of the shaft 14 can be cut to leave a trimmed shaft 26, as shown in FIG. 2. To separate the two plates, a user may cut a portion of this excess length of the shaft 14 sufficient to loosen top plate 12 and remove it from the remainder of the fastener.

The fastener of the present invention can be used to fasten all sorts of material, such as paper in an office setting, mechanical items, decorations, and the like. The fastener can be made with various sizes of base plates 10, top plates 12 and shafts 14, depending on the desired application, so long as the diameter of the base plate 10 is greater than the cross-sectional diameter of the shaft 14. The fastener can be made in various colors or shapes to achieve a desired decorative look, or can be made to match the materials or items to be fastened to achieve a "camouflaged" or less-visible look.

It should be understood, of course, that the foregoing relates to exemplary embodiments of the invention and that modifications may be made without departing from the spirit and scope of the invention as set forth in the following claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A fastener comprising:
   a base plate;
   a ribbed shaft having a length extending from one side of said base plate;
   a top plate having a bottom side, a top side and a throughhole adapted to allow said ribbed shaft to be inserted there through; and
   at least one locking tab protruding into said throughhole, said locking tab operable to engage ribs on said ribbed shaft to prevent said top plate from being slid along the ribbed shaft in a direction opposite the base plate
   wherein said ribbed shaft comprises ribs laterally disposed relative to said ribbed shaft.

2. The fastener of claim 1 wherein substantially the entire length of at least one side of said ribbed shaft is ribbed.

3. The fastener of claim 2 wherein said ribs are positioned on said ribbed shaft at regularly spaced intervals.

4. The fastener of claim 2 wherein the cross-section of said ribs is generally rectangular.

5. The fastener of claim 2 wherein the cross-section of said ribs is generally triangular.

6. The fastener of claim 2 wherein the cross-section of said ribs is generally polygonal.

7. The fastener of claim 2 wherein said ribs are of uniform size and shape.

8. The fastener of claim 1 wherein said ribs are positioned on said ribbed shaft at regularly spaced intervals.

9. The fastener of claim 1 wherein the cross-section of said ribs is generally rectangular.

10. The fastener of claim 1 wherein the cross-section of said ribs is generally triangular.

11. The fastener of claim 1 wherein the cross-section of said ribs is generally polygonal.

12. The fastener of claim 1 wherein said ribs are of uniform size and shape.

13. The fastener of claim 1 wherein said at least one locking tab protrudes from a wall defining said throughhole.

14. The fastener of claim 1 wherein said throughhole comprises a first cavity of greater diameter relative to a second cavity of smaller diameter.

15. The fastener of claim 14 wherein said first cavity is in said top side of said top plate and said second cavity is in said bottom side of said top plate.

16. The fastener of claim 15 wherein said first cavity is defined at its bottom end by a floor having an opening into a top end of said second cavity.

17. The fastener of claim 16 wherein said at least one locking tab protrudes from said floor.

18. The fastener of claim 14 wherein said first cavity is in said bottom side of said top plate and said second cavity is in said top side of said top plate.

19. The fastener of claim 18 wherein said first cavity is defined at its top end by a ceiling having an opening into a bottom end of said second cavity.

20. The fastener of claim 19 wherein said at least one locking tab protrudes from said ceiling.

21. The fastener of claim 1 wherein said fastener is made of a nonmetallic material.

22. The fastener of claim 21 wherein said fastener is strengthened by adding carbon fiber to said nonmetallic material.

23. The fastener of claim 1 wherein the cross-section of said ribbed shaft is generally polygonal.

24. The fastener of claim 23 wherein said polygonal cross-section is generally rectangular.

25. The fastener of claim 23 wherein said polygonal cross-section is generally triangular.

26. The fastener of claim 1 wherein an excess portion of said ribbed shaft protruding through said top plate is trimmed.

* * * * *